No. 12,645. REISSUED MAY 7, 1907.

D. APSTEIN.

PNEUMATIC TIRE PLUG.

APPLICATION FILED MAR. 11, 1907.

WITNESSES

H. A. Lamb.

S. W. Atherton.

INVENTOR

David Apstein

BY

A. M. Worster

ATTORNEY

UNITED STATES PATENT OFFICE.

DAVID APSTEIN, OF BRIDGEPORT, CONNECTICUT.

PNEUMATIC-TIRE PLUG.

No. 12,645. Specification of Reissued Letters Patent. Reissued May 7, 1907.

Original No. 818,402, dated April 24, 1906. Application for reissue filed March 11, 1907. Serial No. 362,328.

*To all whom it may concern:*

Be it known that I, DAVID APSTEIN, a citizen of the United States, and a resident of Bridgeport, in the county of Fairfield and State of Connecticut, have invented certain new and useful Improvements in Pneumatic-Tire Plugs, of which the following is a specification.

It is the object of the invention to improve upon plugs or closers for pneumatic tires by providing a device combining with a tire plug an operating tool therefor, which in itself contains a head for convenience in manipulation and means for producing an opening in a tire sufficient to permit the closer to be inserted, which will not injure or cut the tire when in use, to form the closer itself of such shape as to insure its free passage through a hole in the tire and to further shape the closer to conform to the shape of the tire, thus causing it to press evenly against the same at all points.

In the accompanying drawing forming a part of this specification, similar characters of reference denote like parts in the several figures.

Figure 1:
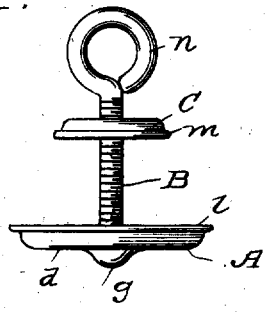
Figure 2:
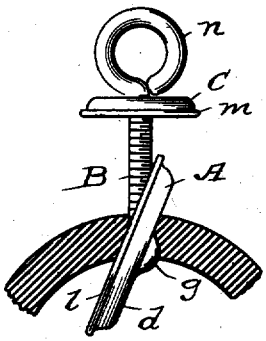
Figure 4:
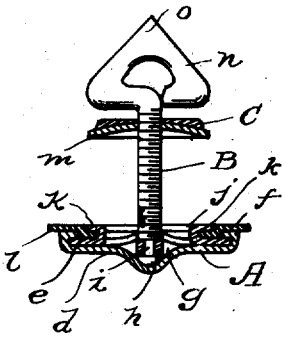
Figure 3:
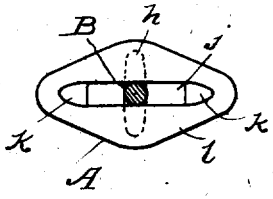
Figure 6:
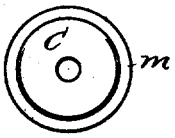
Figure 5:
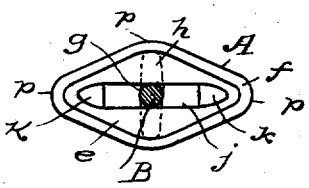

Figure 1 is a side elevation of my improved plug complete; Fig. 2 a further side elevation of my plug, together with a portion of a pneumatic tire, said plug being partially inserted in said tire; Fig. 3 a sectional plan view showing the under side of the closer; Fig. 4 a longitudinal sectional elevation through the closer; Fig. 5 a further sectional plan view of the under side of the closer similar to Fig. 3 but having the flexible washer removed; Fig. 6 a detached plan view of the nut belonging upon the shank; and Fig. 7 is a cross-sectional view of a pneumatic tire with my improved plug attached thereto as in use.

Referring in detail to the characters of reference marked upon the drawing, A indicates the closer which, as shown, is of substantially diamond shape. It is pivotally attached to a threaded shank B, which shank in turn is provided with a nut C to be clamped against the outside of the tire. The closer is preferably formed of two sheet metal parts *d* and *e*, the former representing the outside and the latter the inside, the two being fastened together at their edges by the said outside member having its edges turned in over the edge of the inner member *e* and forming an annular bead *f*, which is slightly broader at the corners *p* to better avoid wear. A transverse enlarged socket *g* is formed centrally of the closer to receive a rocker pin *h* and in a central hole of which the reduced end *i* of the threaded shank B is rotatably mounted. A longitudinal slot *j* is formed through the inner section *e* of the closer to allow the shank B to swing forward or backward. The stock displaced from said slot is deflected outward to form engaging hooks *k* to secure a flexible washer *l* to the under side of the closer, as is clearly shown in the drawing. This washer is formed of rubber, leather or other soft material, and being placed against the under side of the closer serves to engage the inner surface of the tire when the closer is shoved through the tire and set back against the inside. This washer prevents the edge of the closer from unduly wearing or cutting the tire, as is the case with some forms of metal plugs. The rocker pin *h*, mounted in the socket *g* of the closer, is free to turn or rock therein with the swinging movement of the shank, and consequently allows either end of the said closer to be folded back against the shank and with the other end extended, as shown in Fig. 2. In this manner, the closer is inserted through the puncture or opening in the tire and is then swung back or adjusted to substantially a right angle to the shank and clamped by the nut C. In practice, this nut is run down on the shank against the face of the tire, whereupon the said shank is turned to further draw the nut in against the tire. After said nut is forced up to form an air-tight closure, said threaded shank is bent over and broken off even with the face of the nut. The nut, like the head, is provided with a rubber or other flexible washer *m*, which may be cemented thereto. This washer protects the surface of the tire from wear or cutting by the edge of the nut, as is the case with the washer under the head.

For convenience in manipulation, I provide a head *n* of the wire stock of the shank, which head is preferably of a triangular shape, having a sharpened end or cutter *o* which can be used for forming an opening in the tire for the closer.

Figure 7:
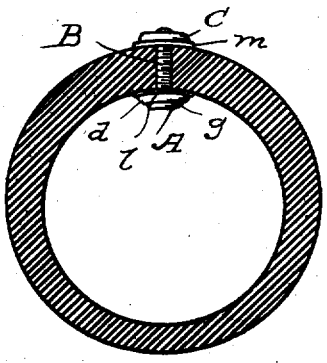

As seen in Fig. 7, the under side of the closer is slightly convexed to better conform to the shape of the tire and to insure its edge bearing equally on the washer which is secured uniformly against the inner side of the tire at all points.

Having thus described my invention, what

I claim, and desire to secure by Letters Patent, is—

1. A pneumatic-tire plug, comprising a closer having a transverse socket therein, a rocker-pin mounted in the socket, a threaded shank rotatably mounted in said rocker-pin, and a nut mounted upon said shank.

2. A pneumatic-tire plug comprising a closer having a transverse socket therein, a rocker-pin mounted in the socket, a threaded shank pivotally mounted in the pin, a nut mounted on the shank, and a flexible washer secured to the under side of the closer.

3. A pneumatic-tire plug, comprising a closer having a transverse socket therein, a rocker-pin mounted in the socket, an annular bead formed on the under side of said closer, a flexible washer to engage the bead, hooks to secure the washer in place, a threaded shank pivotally connected to the rocker-pin, and a nut mounted upon the shank, substantially as described.

4. A pneumatic tire plug, comprising a closer having hooks upon its under side, a flexible washer attached to said hooks, a threaded shank pivoted to the closer, a nut upon the shank and a flexible washer attached to the nut.

5. A pneumatic-tire plug, comprising a closer having a transverse socket therein, a transverse rocker-pin mounted in the socket, a threaded shank rotatably mounted in said rocker-pin, a nut mounted upon said shank, and flexible material secured beneath the closer and nut.

6. A pneumatic-tire plug, comprising a closer convexed on its under side to conform to the normal shape of a tire, a threaded shank swiveled to said closer, and a concave nut mounted on said threaded shank.

7. A device of the character described comprising a closer, a threaded shank to which the closer is connected, a nut engaging the shank, a head upon the shank for convenience in manipulation and a cutter for forming an opening in a tire for the closer.

8. A device of the character described, comprising a closer, a threaded shank to which the closer is connected, a nut engaging the shank, a head for convenience in manipulation and means for forming an opening in a tire for the closer.

Signed at Bridgeport, in the county of Fairfield and State of Connecticut, this 7th day of March, A. D. 1907.

DAVID APSTEIN.

Witnesses:
A. M. WOOSTER,
S. W. ATHERTON.